(12) United States Patent
Wu et al.

(10) Patent No.: US 8,250,095 B2
(45) Date of Patent: Aug. 21, 2012

(54) INTERSYSTEM SINGLE SIGN-ON

(75) Inventors: Yongming Wu, Hangzhou (CN); Zhilong Qian, Hangzhou (CN); Li Cheng, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 448 days.

(21) Appl. No.: 11/689,333

(22) Filed: Mar. 21, 2007

(65) Prior Publication Data

US 2007/0240206 A1    Oct. 11, 2007

(30) Foreign Application Priority Data

Mar. 22, 2006    (CN) .......................... 2006 1 0065558

(51) Int. Cl.
*G06F 17/30* (2006.01)
(52) U.S. Cl. ............................................ 707/783; 726/8
(58) Field of Classification Search .................. 713/182, 713/201; 707/784, 783; 726/8
See application file for complete search history.

(56) References Cited

U.S. PATENT DOCUMENTS

| | | | |
|---|---|---|---|
| 6,438,369 B1 | 8/2002 | Huang et al. | |
| 7,454,623 B2 * | 11/2008 | Hardt | 713/182 |
| 7,634,803 B2 * | 12/2009 | Birk et al. | 726/8 |
| 2003/0177388 A1 * | 9/2003 | Botz et al. | 713/201 |

FOREIGN PATENT DOCUMENTS

| | | |
|---|---|---|
| CN | 1322094 | 11/2001 |
| CN | 1389807 A | 1/2003 |
| CN | 1514394 | 7/2004 |
| CN | 1547343 A | 11/2004 |
| CN | 1604547 | 4/2005 |
| JP | 2000057099 | 2/2000 |
| JP | 2002324051 | 11/2002 |
| JP | 2006074487 | 3/2006 |

OTHER PUBLICATIONS

PCT International Search Report and Written Opinion for application No. PCT/IB2007/051018 mailed on Sep. 6, 2007, 8 pgs.
Denning et al., "Timestamps in Key Distribution Protocols", Communications of the ACM, Aug. 1981, 4 pgs.
JP Office Action mailed Mar. 27, 2012 for Japanese patent application No. 2009-501014, a counterpart foreign application of U.S. Appl. No. 11/689,333, 9 pages.

* cited by examiner

*Primary Examiner* — Huawen Peng
(74) *Attorney, Agent, or Firm* — Lee & Hayes, PLLC

(57) ABSTRACT

Techniques for intersystem Single Sign-On use intersystem user ID mapping to map user IDs of multiple systems. In one implementation, a method obtains a user's ID information associated with a first system, and obtains the user's ID information associated with a second system from the user's ID information associated with the first system according to the intersystem user ID mapping table. The first system sends the user's ID information associated with the second system to the second system, which may allow the user to automatically log on upon successful user ID verification. The user ID information communicated between the systems may be encrypted and decrypted using digital signature techniques. Systems for accomplishing the method are also provided.

21 Claims, 4 Drawing Sheets

INTERSYSTEM SINGLE SIGN-ON

RELATED APPLICATIONS

This application claims benefit of an earlier filing date of Chinese patent application, Application No. 2006100655583, filed Mar. 22, 2006, entitled "SYSTEMS AND METHODS FOR INTERSYSTEM SINGLE SIGN-ON".

BACKGROUND

This disclosure relates generally to computer and internet technologies, and particularly to systems and methods for intersystem Single Sign-On (SSO).

Many internet-based applications require the user to carry out a series of steps crossing multiple systems that collaborate with each other yet each remains independent. For example, in internet commerce applications, a consumer may select a product to purchase on a seller's website, but need to make a payment through another website that belongs to a payment service provider. This procedure is particularly common in consumer-to-consumer (C2C) electronic commerce applications, in which the seller may not be equipped to receive electronic payment, or has not established a reputation to be trusted for making a direct payment. In internet auctions, for example, the buyer makes a purchase selection at a C2C website (auction site), but instead of paying directly to the seller, the buyer often prefers to make a payment through a payment website of a third-party service provider, which may be known for its secure, reliable and convenient instant electronic payment. In this example, the C2C website and the third party payment website are two independent websites maintained by two independent companies, each having its own user ID domain and ID verification mechanism. To complete the purchase transaction, the buyer may have to logon twice, once in the C2C website and another in the third party payment website. From the user (buyer) point of view, however, it is usually desirable to have a smooth and simplified shopping experience without having to sign on two different websites during a single purchase transaction. Under such circumstances, it is desirable to have a Single Sign-On (SSO) mechanism that is convenient, fast and secure.

SSO refers to a logon environment in which a user only needs to enter user ID information once for ID verification, and thereupon can automatically sign on to multiple systems or application programs that require user ID verification. The one-time entry of user ID information is done in one of the multiple systems or application programs. The user is not required to enter user ID information again by the other systems or application programs.

Conventional SSO methods and systems are based on two basic software and hardware components: (1) a centralized user administration system for maintaining a universal user view; and (2) a common user ID verification system for conducting unified user ID verification. A user first signs on at the common user ID verification system using a universal user ID, and thereby obtains an authorized token to prove their ID to the participating systems. As the user requests to visit a participating system within the same user ID administrative domain, the authorized token is included in the user's logon request as a hidden "password". The target participating system inquires the common user ID verification system to verify the validity of the token, and determines whether the user ID is valid based on the results of the inquiry.

FIG. 1 illustrates an example of the conventional SSO method and system. The procedure for a single sign-on according to the method and system in FIG. 1 is described as follows:

At step one, a user (not shown) makes an initial request through user browser 100 to application system 110 for accessing a certain resource therein. Upon finding that the user does not have an authorized ID token, application system 110 redirects the user to common ID verification and authorization system 120 for ID verification. The common ID verification and authorization system 120 utilizes a common user ID library 130 for user ID administration.

At step two, the user passes ID verification process at the common ID verification and authorization system 120 and receives an authorized ID token.

At step three, the user is redirected by the common ID verification and authorization system 120 to application system 110, and sends the authorized ID token to application system 110.

At step four, application system 110 sends the authorized ID token to the common ID verification and authorization system 120 to verify the validity of the ID token. If the ID token is verified to be valid, application system 110 allows the user to access the requested resource; if not, application system 110 denies access by the user.

As illustrated, the conventional SSO method requires a common ID verification and authorization system shared by multiple application systems, and further requires a common user ID library. With multiple application systems hosted at diverse websites that use various administrative systems, establishing a common user ID library and common ID verification and authorization system poses difficulties in both administration strategies and technical implementations. Representative examples of such difficulties include:

1. Different websites have different user groups. These user groups each constitute a set. These sets may intersect with each other but usually are not identical to each other. As a result, it is difficult to combine and unify different user groups into a common user ID library.

2. Different websites have their own unique strategy and procedure for user registration and administration. Requiring different websites to convert their systems to a common user ID administrative system for universal user registration and administration is often incompatible with business requirements.

3. Although the common user ID library is shared by multiple systems, each system may need to upgrade independently. As a result, it is difficult to establish a consensus with regard to the standard to be used, and further difficult to determine which system should have the primacy in establishing and maintaining the common user ID library.

4. On the internet, ID tokens are usually communicated using cookies, which generally require that all website systems of the same SSO logon domain belong to the same network domain. Although possible, establishing SSO across different network domains requires a very complicated procedure.

5. The common user ID verification system is a centralized session management unit and is typically prone to single point faults and performance bottleneck problems. Solving such problems may require costly and complicated cluster technology, significantly increasing the cost for constructing and maintaining the system.

6. Considerable modification and renovation of the present system may be necessary in order to change multiple discrete user ID verification and administration systems into a common user ID verification and administration system. This not only increases the cost, but also adds a great deal of risk.

For the foregoing reasons, there exist a significant need for an improved SSO method and system.

SUMMARY

Single Sign-On (SSO) techniques using a distributed model of user ID management, instead of a conventional centralized model, are described. The intersystem Single Sign-On is made possible by using a user ID mapping concept to map user IDs of multiple systems.

According to one aspect, a method for Single Sign-On between a first system and a second system is provided. The first system obtains a user's ID information associated with the first system. The first system then obtains the user's ID information associated with the second system from the user's ID information associated with the first system according to an intersystem user ID mapping relationship, and sends the user's ID information associated with the second system to the second system. Upon receiving the user's ID information, the second system allows the user to be signed on the second system.

In one embodiment, the user ID information communicated between the systems is encrypted using digital signature techniques. For example, the first system creates a signature attached to the user's ID information associated with the second system, and sends the signature along with the user's ID information associated with the second system to the second system. The second system verifies the user ID information by examining the signature received. In one exemplary application, the user is first signed on the first system. The second system allows the user to be signed on the second system if the user's ID information is verified. The first system may request the user to sign on to verify the user's ID if the user is not already signed on the first system.

The first system may be configured to create the signature upon receiving an indication that the user intends to sign on the second system. The indication may either be a logon request initiated by the user in the first system, or a logon request redirected to the first system by the second system.

In one embodiment of the method, the first system indicates to the second system that the user is from the first system. The second system may use this knowledge to refine, for example limit, the privileges of the user when signed on the second system.

The signature may be a cryptographic digital signature encrypted by the first system. Accordingly, the second system decrypts the cryptographic digital signature to validate the signature. Encryption and decryption may be done using any suitable cryptographic techniques such as public-key encryption and private-key encryption. Hashing technique may also be used. For example, the first system may create a hash from at least part of the user ID information associated with the second system before sending the user ID information to the second system.

In one embodiment, the first system timestamps the signature and/or the user's ID information associated with the second system before sending the signature and/or the user's ID information to be second system. The second system validates the signature and/or the user's ID information by checking the time-stamping information. For example, the time-stamping information may be checked by comparing a present stamped time with a previous stamped time associated with the same user. The signature and/or the user's ID information are validated only if the present stamped time is subsequent to the previous stamped time. The second system may keep a log record of the signatures and the user's ID information received.

According to another aspect, a system is provided for verifying intersystem user sign-on. The system has a data storage and an ID verification device for verifying the ID of a user requesting logon using user information stored in the data storage. The system further has user ID mapping data stored in the data storage. The user ID mapping data defines a mapping relationship between the user ID information associated with the present system and user ID information associated with a partner system. The system is adapted for obtaining the user ID information associated with the partner system from the user ID information associated with the system using the matching relationship.

In one embodiment, the system has a signature generator for generating a signature attached to the user ID information associated with the partner system. The signature generator may use an encryption algorithm.

According to another aspect, a system for verifying intersystem user sign-on has a data storage storing user ID information associated with the present system and an ID verification device for verifying a user ID using the user ID information stored in the data storage. The system further has a signature verification device for decrypting a signature attached to a user ID received from a partner system and verifying the user ID received from the partner system by checking the user ID information stored in the data storage. The system may allow the user to logon upon a successful verification of the signature by the signature verification device. In one embodiment, the system further has a user privilege controller for limiting privileges of the user's session according to the user's logon manner.

Unlike the conventional SSO methods and systems, the techniques described in the present disclosure use a distributed user management model instead of a centralized one. Using the intersystem ID mapping concept, a straightforward user ID mapping table may be constructed to coordinate user ID information associated with different systems. Digital signature technology can be used for enhanced security. Both user ID mapping and digital signature technology are simple extensions of existing systems and do not require fundamental changes of the existing user ID verification systems. A large collaborative system including multiple independent systems may be built based on mutual trust relationships without requiring each system to significantly modify itself or surrender its independence.

Other features and advantages of the described techniques will become more readily understandable from the following detailed description and figures.

BRIEF DESCRIPTION OF THE FIGURES

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

As will be demonstrated in the following representative embodiments, the techniques described herein move away from the centralized model for user ID administration found in the existing Single Sign-On (SSO) methods, and introduce a distributed model for user ID administration. The design addresses the problems of high-level technical complexity and administrative difficulties.

According to one aspect of the disclosure, a method is provided for intersystem Single Sign-On using intersystem user ID mapping to map user IDs of multiple systems. Separate partner systems, each of which may be an independent website such as a C2C website or payment website, are allowed to keep their own user IDs and user ID administrative system, and not required to be conformed to a common user ID library and a common user ID administrative system.

Because the user IDs associated with different systems may be different even for the same user, the present disclosure introduces an intersystem user ID mapping technique to coordinate among the different systems. Mapping defines a matching correspondence between the IDs of the same user associated with different systems. Each ID of a certain user may have basic attributes such as a username and password, which may be different in different systems, but may also include other attributes such as birth date, address, and preferences. Mapping may be done in any suitable manner but preferably should allow the system to identify each user uniquely, and to allow each user's ID information associated with one system to be identified based on the knowledge of the user's ID information associated with another system.

Figure 1:
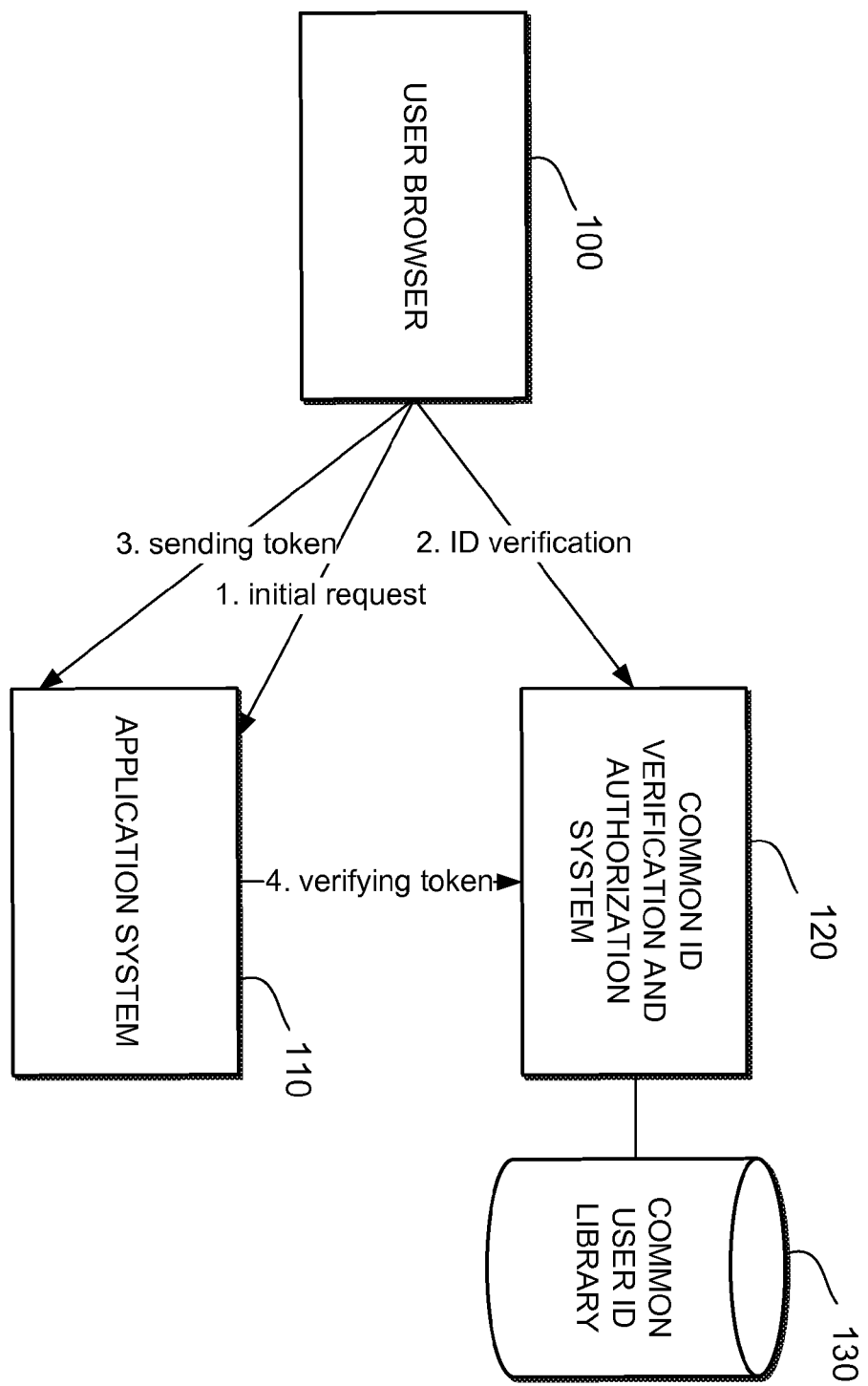
FIG. 1 illustrates an example of a conventional SSO method and system.
Figure 2:
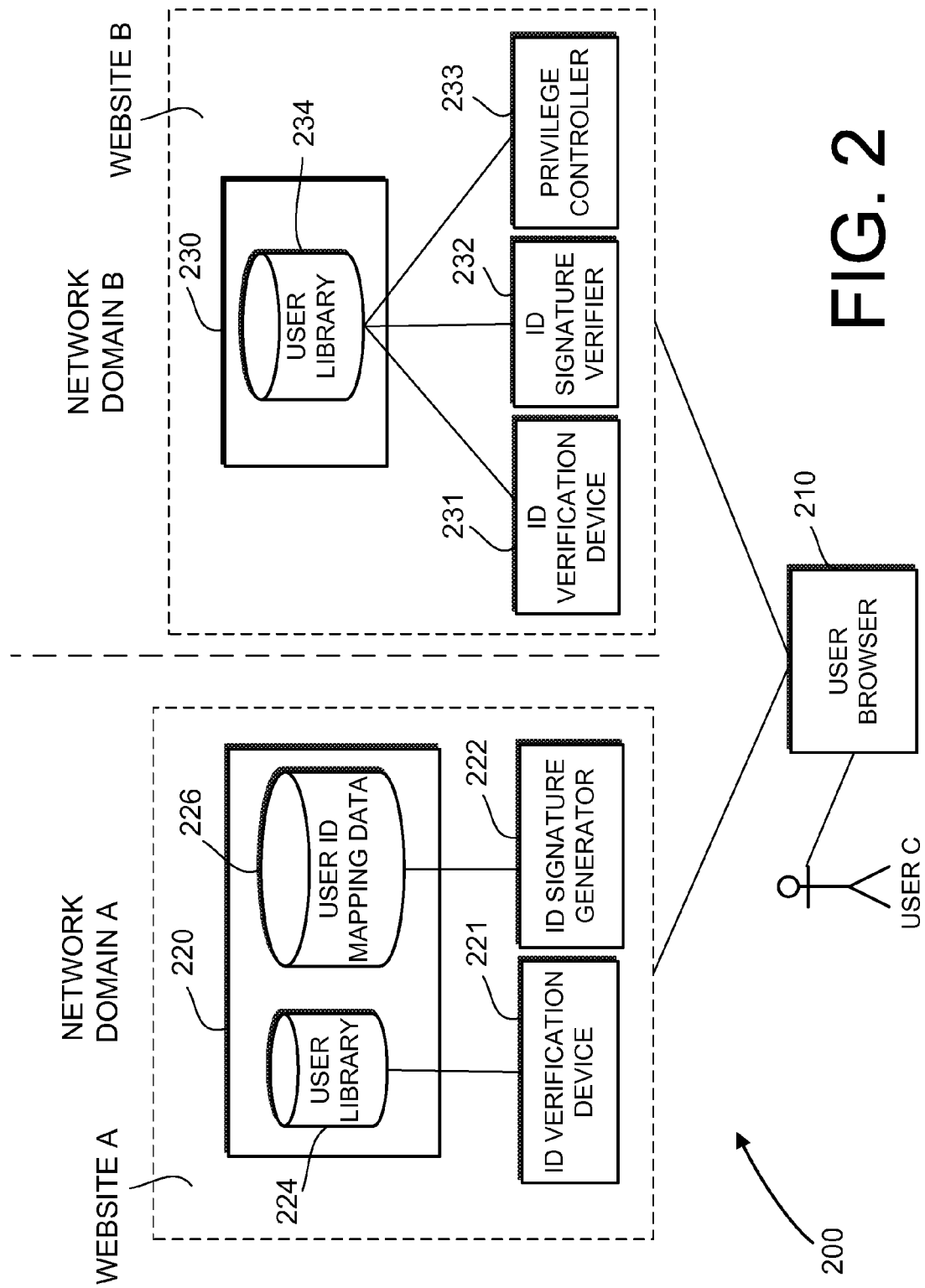
FIG. 2 is a diagrammatic illustration of an exemplary system to accomplish Single Sign-On in an internet electronic commerce.

FIG. 2 is a diagrammatic illustration of an exemplary system 200 to accomplish Single Sign-On in an internet electronic commerce in accordance with the present disclosure. As shown in FIG. 2, User C tries to conduct through user browser 210 an internet transaction involving two partner systems, which are represented by Website A and Website B. Single Sign-On is accomplished between Website A and Website B. Website A and Website B are two independent websites on the internet They may be located anywhere on the internet, and may belong to two different domains—Network Domain A and Network Domain B—but may also belong to the same network domain.

Website A has its own user group, which is defined by user library 224 stored in data storage 220. Website B also has its own user group, which is defined by user library 234 stored in data storage 230. Data storages 220 and 230 may each be a single storage device or a complex storage system.

Website A further has ID verification device 221 for verifying ID of a user requesting logon. The verification process utilizes the user ID information in user library 224 stored in data storage 220. The user is allowed to access a requested resource on Website A if the user's ID has been verified.

Website A further has user ID mapping data 226 stored in data storage 220. The user ID mapping data 226 defines mapping relationships between user ID information associated with Website A and user ID information associated with Website B. The user ID mapping data 226 enables Website A to obtain the user ID information associated with Website B from the same user's ID information associated with Website A.

Website A further has ID signature generator 222 for generating a signature attached to the user ID information associated with Website B. ID signature generator 222 and ID verification device 221 may be embodied either in two separate units or a single unit.

Website B also has ID verification device 231 for verifying a user ID using the user ID information in user library 234 stored in data storage 230. Website B further includes signature verification device 232 for decrypting the signature attached to the user ID information received from Website A. ID verification device 231 and ID signature verification device 232 may be embodied either in two separate units or a single unit.

Signature decryption is used for verifying the authenticity and integrity of the user ID received from Website A. A user may be allowed to access a requested resource on Website B if the user's ID has been verified.

In an exemplary application, Website A and Website B establish a partnership for electronic commerce. The partnership allows Website A and Website B to exchange user information and accordingly collect user ID mapping data 226, which may be in the form of a mapping table. User C is a customer of both Website A and Website B. Typically, User C may have become a customer of Website A and Website B separately and independently. The same User C may have different user ID information (e.g., a different username or password) associated with Website A and Website B. For example, if User C's ID associated with Website A is CA and User C's ID associated with Website B is CB, user ID mapping data 226 (such as a mapping table) would contain an entry indicating a mapping relationship between CA and CB as CA→CB, meaning that the user whose ID on Website A is CA has an ID CB on Website B. When properly constructed, user ID mapping data 226 would allow Website A to uniquely identify each user, and to allow each user's ID information associated Website B to be identified based on the knowledge of the same user's ID information associated with Website A.

The matched ID information may comprise attributes such as a logon username and a password, but may include additional attributes, varying from system to system. Furthermore, additional information used for verification of the user ID, and for controlling and limiting of user privileges may also be attached to user ID information.

In an exemplary process, Website A obtains User C's ID information associated with Website A when User C signs on to Website A through user browser 210. With proper use of ID mapping data 226, Website A obtains User C's ID information associated with Website B from the same User C's ID information associated with Website A. Website A then sends the user's ID information associated with Website B to Website B. Upon receiving the user's ID information, the second system may allow User C to be signed on if the received ID information is satisfactory.

The user ID information communicated between Website A and Website B may be encrypted using digital signature techniques in order to have security. Website A has ID signature generator 222 for this purpose. For example, after User C has successfully signed on Website A, which has then determined User C's ID information associated with Website A and Website B to be CA and CB, respectively, ID signature generator 222 may digitally sign the user ID information CB before sending it to Website B. Any suitable cryptographic technique may be used for generating a signature for digitally signing user ID information CB. Generally, a signature algorithm needs to be agreed upon by both Website A and Website B in order to coordinate encryption in Website A and decryption in Website B. One example of a suitable signature algorithm is public-key signature algorithm, with which Website A may sign user ID information using its private key, and allow Website B to decrypt the signature using the public-key matching the private key of Website A.

The digital signature generated by ID signature generator 222 at Website A is attached to the user's ID information CB associated with the second system. The digital signature and ID information CB are then both sent to Website B to request logon to Website B.

Website B receives logon request from Website A and detects that the logon request contains a signature that needs to be verified. Website B has ID signature verifier 232 for this purpose. ID signature verifier 232 decrypts the signature and verifies the validity, such as authenticity and integrity, of the signature and the user's ID information received. If the signature and the user's ID information pass the validity test, Website B determines the ID of User C from the ID information sent by Website A. Website B may accept CB as User C's valid ID associated with Website B, and accordingly establish a proper role and a session for User C.

If the signature and the ID information fail to pass the validity test, Website B shall deny the logon request by User C. In some cases, even if the signature and the ID information may pass the validity test, the particular user ID CB may still not be allowed logon due to certain additional restrictions implemented at Website B. For example, the particular user ID CB may have expired, or otherwise carries a wrong status, or is found to be in a blacklist maintained by Website B. Under such circumstances, Website B may still deny User C's logon request.

Website B further has privilege controller 233 to control the privileges given to User C as a visitor to access resources on Website B. Usually, a user with a certain user ID has an inherent set of privileges prescribed when the user ID is created. However, sometimes it is desirable to further control the privileges of a user depending on the manner the user is requesting logon. For example, a user who is directly logging on Website B may be given its inherent privileges, while a user who is redirected from another website (e.g., Website A in the present example), may be given fewer privileges. To determine the inherent privileges of a user requesting logon, privilege controller 233 may inquire user library 234 stored on data storage 230. To determine the logging manner of a user, privilege controller 233 may consult with the logon request information (included with the signature and the user ID) sent from Website A. Alternatively, privilege controller 232 may also consult with session information recorded on Website B which contains information for the user's logon manner. Session information is usually recorded in a log file on Website B after User C has signed on and established a session.

In an exemplary application, Website A is a C2C website and Website B is a payment website. When User C signs on to Website B (payment website) through a Single Sign-On process initiated at Website A (C2C website), privilege controller 233 may restrict the privileges of User C's present session such that User C may only conduct payment transactions related to Website A and not conduct payment transactions related to other websites during the present session. In general, payment websites have more heightened securities than C2C websites. Using privilege controller 233 helps to achieve a better partnership having a proper balance between security and convenience. For instance, with proper privilege control, even if the user ID information (such as a username, and a password or security code) associated with the C2C website is stolen or otherwise compromised, only transactions between the user and the C2C website would be affected.

As illustrated above, Single Sign-On between Website A and Website B is enabled by user ID mapping data and further secured by a digital ID signature technique. The signature algorithm used for digital ID signature is an important component for providing security in Single Sign-On in accordance with the present disclosure. Preferably, the signature algorithm should satisfy the following aspects of security requirements:

(1) Authenticity, which is to verify that the information (including the signature, the signed user ID information associated with Website B, and other additional signed information) was indeed sent by Website A.

(2) Integrity, which is to verify that the signature and the ID information have not been tampered by unauthorized party after the ID information has been signed.

(3) Non-Repudiation, which is to guarantee that other than Website A, no one else, including Website B and any other third party, could have created the effective signature on record. With a proper non-repudiation measure, in case where dispute arises over the question of validity and security, Website A would not be able to deny that it is the creator of the signature on record.

(4) Anti-Replay, which is to guarantee that the ID signature can only be effectively used once. Once used, an ID signature will no longer be valid and therefore cannot be used again. This is to prevent a third party eavesdropper from stealing the user ID signature and reapplying the signature to gain logon access to Website B.

One exemplary technique to accomplish the above-described security measures (authenticity, integrity and non-repudiation) is public-key digital signature algorithm. To use this algorithm, Website A and Website B agree in advance on a pair of public-key and private key. The private key is kept by Website A in secrecy from other entities including Website B. The public-key that matches the private key is made public, and in particular known to Website B. In actual application, ID signature generator 222 in Website A applies the public-key digital signature algorithm and signs the user ID information associated with Website B using the private key. Upon receiving the signed user ID, ID signature verifier 232 of Website B decrypts the received signature using the public-key according to the same public-key digital signature algorithm. This encryption-decryption procedure provides a basis for verifying the authenticity and integrity of the ID signature signed by Website A. At the same time, Website B records the verified ID signature in a session log to provide a non-repudiation measure. With the recorded session log, Website A is prevented from denying having executed the recorded ID signature in case a dispute arises.

One exemplary technique to prevent replaying is using timestamping. The user ID communicated from Website A to Website B can be timed stamped, and the logon request may also include information indicating that the user ID is time stamped and needs to be checked and verified by the recipient system Website B. In a preferable embodiment, timestamping is implemented as an integral part of the signing procedure of a digital signature. For example, the digital signature algorithm chosen for creating the signature may require that a timestamp be attached to the ID information to be signed at Website A, and that the timestamp and the ID information be signed together. This guarantees the authenticity and integrity of both the ID information and the timestamping information. At Website B, decrypting the signature verifies the authenticity and integrity of both the ID information and the timestamping information at the same time.

The timestamping information may be used for anti-replay in various ways. The following are two examples.

1. At Website B, as ID signature verifier 232 verifies the ID signature received from Website A, it compares the timestamp of the present ID signature with the timestamp of the previous ID signature of the same user (User C) sent from Website A. Because consecutive logon requests by the same user are always incremental in time, a replay attempt may be detected if the present timestamp is either older than the previous timestamp or identical to the previous timestamp. Upon such detection, the ID signature verification fails and Website B denies access by User C.

If User C is visiting Website B the first time, the timestamp may need to be accepted without comparing to a previous timestamp, but there is no risk of replay in this special situation as the signature and the user ID information are being applied the first time. If User C is making a genuine legitimate repeating visit, the present signature and the previous signature would have been created separately with different, unique and consecutive timestamps. Using this technique, once User C makes a genuine visit with a certain signature, the same signature effectively expires. This technique requires that Website B keeps a log record of all logon requests including the additional attached information such as timestamps.

2. Website A and Website B agree on a time limit of the validity of a signature after its creation. For example, Website A and Website B may have agreed that the signature is valid only for one minute after it has been created. Upon receiving the signature, Website B compares the timestamp of the signature and the present time (real clock time) to determine whether the signature is still valid. Using this technique, in any event where a signature is stolen or leaked, its validity is limited to one minute only. The consequence of a security breach is therefore minimized. In practice, it may be preferable for Website A to send signed user ID information immediately upon the creation of the signature. This may enable Website A and Website B to agree upon an expiration time limit much shorter than one minute.

The above two techniques for using timestamping information are not exclusive to each other. They may be combined in practice. For example, the first technique, if used alone, could be compromised in an event where the signature created at Website A was stolen or leaked before it was ever communicated to Website B. In this case, Website B would not have a proper record of the timestamps of User C, and a perpetrator in possession of the stolen or leaked signature could pass the timestamp test. A combination of both the first technique and the second technique described above, however, may solve the problem because a stolen or leaked signature is likely not to be applied until a considerable amount of time has elapsed.

Signature algorithms that can be used for signature creation and verification are not limited to public-key signature algorithms such as Digital Signature Algorithm (DSA). Various techniques are available, and may be chosen to best suit the needs of the partner websites. For example, if Website A and Website B has a sufficient level of mutual trust, there may not require a mechanism for non-repudiation. In this case, Website A may use a private-key algorithm to encrypt user ID information and timestamping information, and send a ciphertext (cryptographic text string) to Website B to guarantee authenticity, integrity and anti-replay.

Alternatively, an even simpler algorithm such as hash algorithm SHA1 (Secure Hash Algorithm, version 1.0) or MD5 (Message Digest, version 5), may be used for signing the ID information and the timestamping information. With a hash algorithm, a seed chosen and agreed upon by both parties (Website A and Website B) may be used to prevent a third party from creating an effective signature for user ID information.

Figure 3:
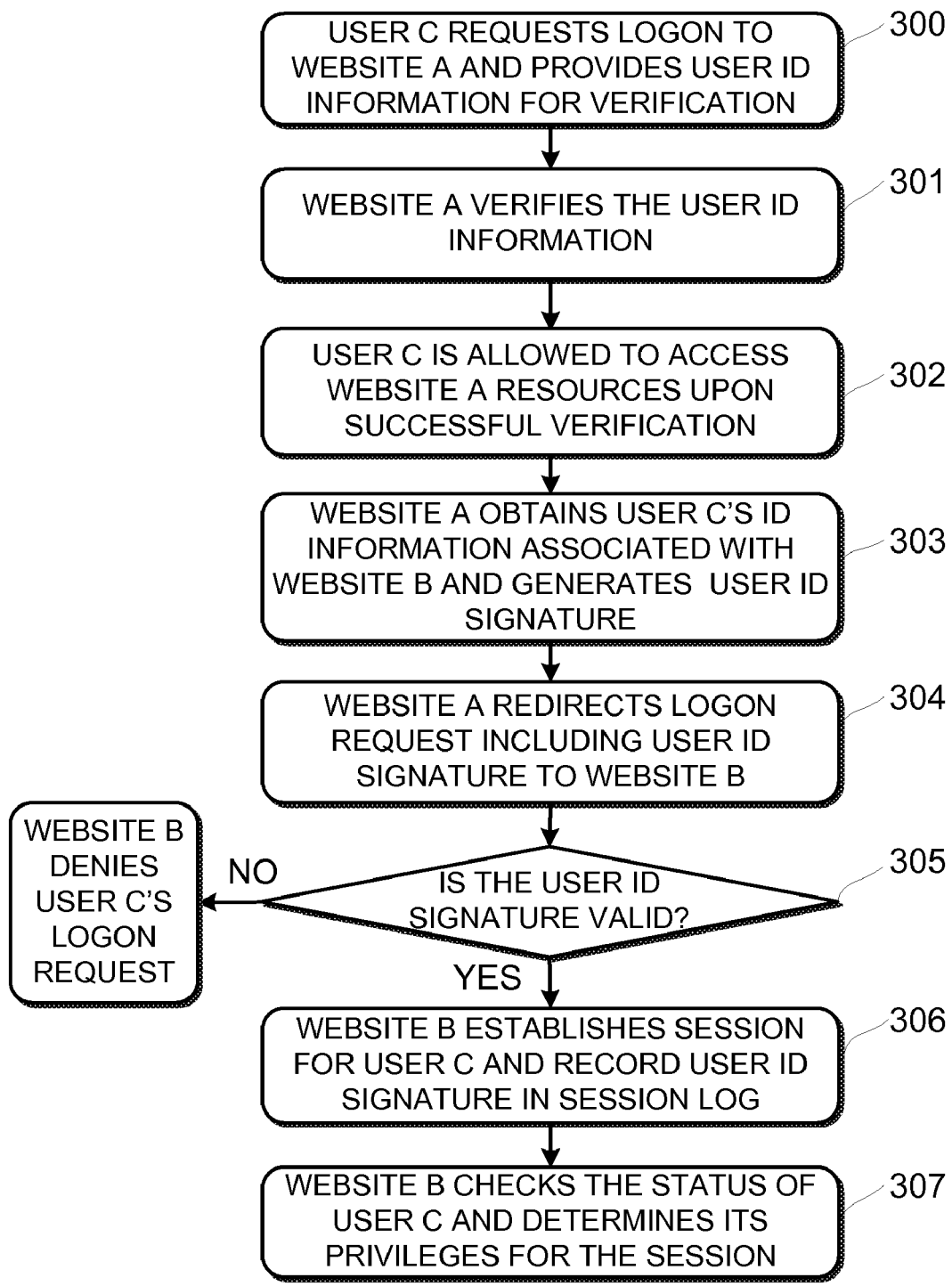
FIG. 3 is a flow diagram illustrating an exemplary Single Sign-On process.

FIG. 3 is a flow diagram illustrating an exemplary Single Sign-On process in accordance with the present disclosure. The process is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the process is described with reference to the system 200 of FIG. 2

In this example, the user first signs on to Website A. Website A initiates the process of generating a user ID signature to accomplish automatic logon to Website B. The exemplary Single Sign-On process is described below in blocks.

At block 300, User C requests logon to Website A and enters ID information (such as username and password) for ID verification.

At block 301, ID verification device 221 of Website A reads user ID information from user library 224 stored on data storage 220 and verifies the user ID information provided by User C.

At block 302, User C is allowed to access resources on Website A upon successful user ID verification.

At block 303, Website A determines User C's ID information associated with Website B and generates user ID signature based on user ID information. In some cases, before User C's ID information is determined and signed, a mechanism might be employed that permits Website A to detect whether User C should sign on at Website B. This may be done either automatically or upon receiving an explicit instruction by User C. For example, Website A may automatically detect that User C intends to sign on Website B if User C has requested a resource on Website A which requires service or support from Website B.

User C's ID information associated with Website B is determined using the user ID mapping data 226 stored on data storage 220 at Website A. For example, if the user ID mapping data 226 comprises a Website A/Website B (A/B) mapping table, ID signature generator 222 may obtain User C's ID information associated with Website B by reading the mapping table. ID signature generator 222 then uses the agreed-upon signature algorithm to sign User C's ID information associated with Website B and other additional information (such as timestamping information). ID signature generator 222 further attaches the ID signature to the logon request for Website B.

At block 304, Website A directs the logon request including user ID signature to Website B. In the logon request, Website A may further label User C as being coming from Website A. Such labeling may be in the form of a different subdomain name or an additional attached parameter.

At block 305, Website B determines whether the user ID signature received from Website A is valid. This is accomplished by ID signature verifier 232 which uses the agreed-upon signature algorithm to decrypt the signature. If the user ID signature is invalid, Website B denies User C's logon request. If the user ID signature is valid, the process proceeds to the next step 306.

At block 306, having decided that the user ID signature from Website A is valid, Website B determines that User C has already signed on the trusted Website A and therefore should be given permission to log on Website B as well. Accordingly, Website B establishes a session for User C to allow User C to access the requested resource on Website B. The session is established according to the user ID information associated with Website B which is identified from the user ID information received from Website A. Website B may further record user ID signature in a session log, which may be used for other purposes such as timestamp comparison for future logon request.

At block 307, Website B checks the status of User C and determines its privileges for the established session. This is accomplished by privilege controller 233. If it is found that the particular User C does not have the privilege to assess the specific requested resource, Website B denies User C's request, despite a valid user ID of User C. If it is found that the particular User C has the privilege to access the specific requested resource, Website B allows such access.

It is appreciated that the above steps may be combined into fewer steps or further expanded into more steps to accomplish the same or similar goal. For example, step 306 and step 307 may be carried out at the same time as a single step.

The above-described Single Sign-On process may be a onetime exercise for an unclosed session involving multiple requests or multiple transactions by the same User C. Once User C and Website B has established a valid session, User C may choose to continue the session and directly access authorized resources on Website B without having to return to Website A to repeat the above described Single Sign-On process. A continuous session may include repeated accesses to the original resource accessed or new accesses to the other authorized resources.

In the above exemplary embodiment, Website A initiates the signature process. It should be noted that a signature needs not to be generated every time when User C requests logon to Website B. The method in accordance with the present disclosure may be designed in a way that Website A is required to sign user ID information only when a new signature is necessary. For example, instead of having Website A initiating on its own a signature process every time when User C tries to visit Website B from Website A, Website A may take this action only when it receives from Website B a request for sending signed user ID information. This design will avoid unnecessary repetition and redundancy of signature generation and verification. Because executing a signature algorithm takes an appreciable amount of computation resources, reducing the number of such executions may save a considerable amount of operating cost. In addition, fewer incidences of signature generation and verification also results in less record-keeping and lower risks of signature leaking.

Figure 4:
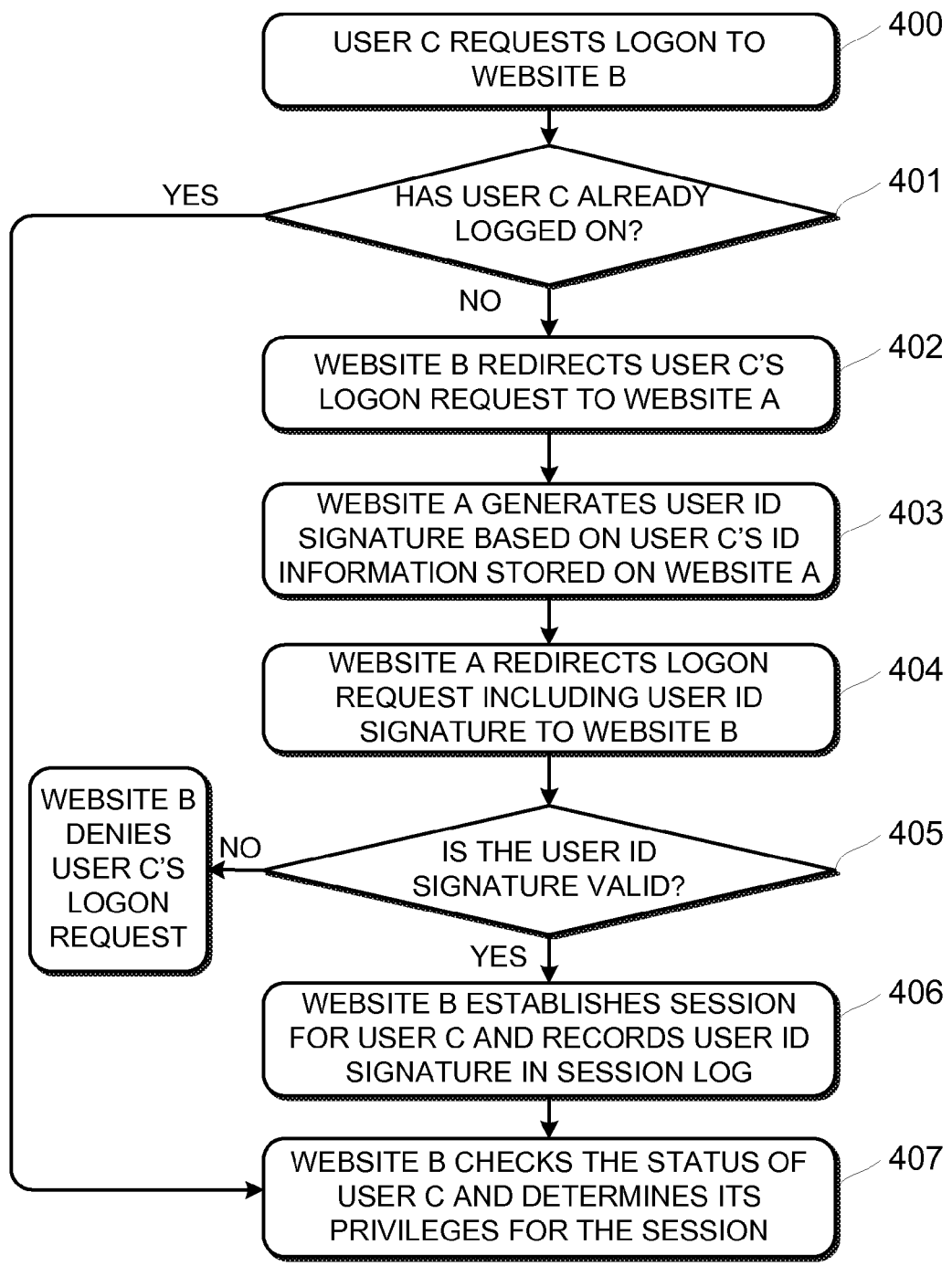
FIG. 4 is a flow diagram illustrating exemplary Single Sign-On process in which Website B decides when to request Website A to sign user ID information.

FIG. 4 is a flow diagram illustrating exemplary Single Sign-On process in which Website B decides when to request Website A to sign user ID information. The exemplary process is described in blocks below.

At block 400, User C requests logon to Website B to access a certain resource. This may be initiated by User C at Website B directly, but in the illustrated example where Website A is a C2C site while Website B is a payment site, it is more likely that the request for logon is directed to Website B from Website A. In this case, the logon request may identify User C as being coming from Website A. Such identification may comprise either a different subdomain name, or an additional parameter in the logon request information.

At block 401, Website B determines whether User C has already signed on Website B, either directly or indirectly from website be through a Single Sign-On process. If User C has already signed on Website B, the process skips steps of signature generation and verification and jumps to step 407 where Website B determines User C's privileges for accessing the requested resource. If User C has not signed on Website B, the process proceeds to step 402.

At block 402, Website B redirects User C's logon request to Website A. The request includes a parameter to identify a need for Website A to send the ID information of User C to Website B. If the ID information is secured by a signature, the request may include a parameter to identify a need for Website A to securely sign the ID information to be sent to Website B. If necessary, the request may also identify the particular resource or resources on Website B User C is requesting to access.

At block 403, ID signature generator 222 on Website A reads from user ID mapping data 226 User C's user ID information associated with Website B and generates user ID signature over the user ID information using the signature algorithm agreed upon by Website A and Website B. The user ID signature may also cover additional information such as timestamping information. Preferably, Website A may check whether User C has already signed on Website A at the beginning of step 403. If User C has not already signed on Website A, Website A generally should request User C to sign on Website A first before executing step 403. In this case, a regular logon process takes place in which username and password may be requested and verified by ID verification device 221.

At block 404, Website A attaches the newly generated user ID signature to the logon request and redirects logon request including user ID signature to Website B.

At block 405, ID signature verifier 232 of Website B verifies the validity of the ID signature by decrypting the ID signature using the signature algorithm agreed upon by Website A and Website B. If the ID signature is invalid, Website B denies User C access to the requested resource. If the ID signature is valid, the process proceeds to step 406.

At block 406, having decided that the user ID signature from Website A is valid, Website B determines that User C has already signed on the trusted Website A and establishes a session for User C to allow User C to access the requested resource on Website B. The session is established according to the user ID information associated with Website B received from Website A. Website B may further record user ID signature in a session log, which may be used for other purposes such as timestamp comparison for future logon requests.

At block 407, privilege controller 233 of Website B checks the status of User C and determines its privileges for the established session. If User C is found to have no privilege to assess the specific requested resource, Website B denies User C's request. If User C is found to have the privilege to access the requested resource, Website B allows such access.

The above techniques may be implemented with the help of one or more computer-readable media containing computer-executable instructions. The computer-executable instructions enable the processor to perform an intersystem single sign-on (SSO) procedure in accordance with the techniques described herein. It is appreciated that the computer readable media may be any of the suitable memory devices for storing computer data. Such memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-ex-complete instructions may either be delivered in a tangible physical memory device or transmitted electronically.

As illustrated herein, the present disclosure proposes a distributed model for Single Sign-On by introducing an intersystem user ID mapping concept. The distributed model avoids some of the management risks and technical risks inherent with conventional centralized model of Single Sign-On methods. Partner systems (e.g., Website A and Website B in the exemplary embodiments) remain their independence, while the user ID mapping component between the partner systems is flexible and may be constructed, modified or removed easily according to the actual need at the time.

With the distributed model, the ID signature generator and the ID signature verifier establish a mutually trusted intersystem (e.g., inter-website) Single Sign-On mechanism without having to use a centralized user ID verification system, thus avoiding potential performance bottleneck and single point fault problems caused by centralized user ID verification systems. The ID signature generator and the ID signature verifier in accordance with the present disclosure are simple extensions of the existing websites. In contrast to centralized ID verification systems, the techniques described in the present disclosure do not require significant modification of the original ID verification system of the existing websites. This helps to relieve the problems of high operating cost and high risk of the conventional Single Sign-On methods.

Security features are also a simple extension of the existing systems. A suitable signature algorithm can be readily chosen and implemented by the parties to guarantee authenticity, integrity, non-repudiation and anti-replay of the Single Sign-On process. The level of security can satisfy the most stringent security requirement of the websites conducting electronic commerce. The Single Sign-On procedure in accordance with the present disclosure may be optimized to minimize the occurrences of signature generation and verification, thus achieving the design goals of speediness and convenience.

It is appreciated that although the exemplary embodiments are illustrated using two partner websites Website A and Website B, the techniques described in the present disclosure are not limited to this type of applications. For example, in addition to establishing a website A/B user ID mapping table with Website B, Website A may also establish a website A/C user ID mapping table with Website C. Likewise, Website B may also establish a website B/C user ID mapping table with Website C. That is, Website C may establish partner relationship with multiple websites. In addition, Website B may also establish a website B/A user ID mapping table to conduct transactions that are reverse of the transactions conducted using the website A/B user ID mapping table as described herein. Regardless of the complexity of the implementation and the number of parties involved, two websites that have established a user ID mapping table may conduct transactions in the same manner as described herein.

Furthermore, although the exemplary embodiments are illustrated using websites in the context of electronic commerce, the techniques described in the present disclosure are not limited to this type of applications. The techniques may be applied in any network systems and communication systems such as instant messaging systems where at least one of the partner systems requires user ID verification to access a resource in the system.

It should be noted that the term "user ID signature" used herein refers to a signature signed over, or attached to, certain user ID information, and does not suggest that the signature is to be signed by the owner of a user ID. In the exemplary embodiments discussed herein, for example, it is preferable that the first system (e.g., Website A) signs the user ID information of a user (User C), instead of having the user himself to sign the user ID information.

The above description, including the specification and drawings, is illustrative and not restrictive. Many variations of the techniques will become apparent to those of skill in the art upon review of this disclosure. Various features and aspects of the above-described disclosure may be used individually or jointly. Further, the present disclosure can be utilized in any number of environments and applications beyond those described herein without departing from the broader spirit and scope of the specification. The scope of the disclosure should, therefore, be determined not with reference to the above description, but instead should be determined with reference to the appended claims along with their full scope of equivalents.

The invention claimed is:

1. A method for intersystem single sign-on (SSO), the method comprising:
obtaining user ID information associated with a first system;
in the first system, obtaining the user ID information associated with a second system from the user ID information associated with the first system according to an ID mapping relationship of a user between the first system and the second system, the user ID information associated with the second system being different than the user ID information associated with the first system, the first system and the second system being located in different network domains;
in the first system, creating a signature that includes a timestamp and the user ID information associated with the second system before sending the signature to the second system, the creating the signature taking place upon receiving a logon request redirected to the first system by the second system;
redirecting the logon request back to the second system upon the creating the signature;
sending the signature to the second system to validate the signature by comparing the timestamp of the signature with a timestamp of a previous signature of the user and by comparing the user ID information associated with the second system included in the signature with user ID information stored in the second system,
the signature being valid when:
a first time indicated by the timestamp of the signature is after a second time indicated by the timestamp of the previous signature of the user, and
the first time indicated by the timestamp of the signature is within a predetermined threshold duration of a present time.

2. The method as recited in claim 1, wherein the user is first signed on the first system, wherein verification of
the user ID information allows a user to be signed on the second system.

3. The method as recited in claim 1 wherein creating the signature takes place upon receiving an indication that the user intends to sign on the second system.

4. The method as recited in claim 1, further comprising:
in the first system, requesting the user to sign on to verify the user ID information if the user is not already signed on the first system.

5. The method as recited in claim 1, further comprising:
indicating to the second system that the user is being redirected from the first system.

6. The method as recited in claim 1, wherein the determining of the signature to be valid comprises determining the signature to be valid based on a trust relationship between the first system and the second system.

7. The method as recited in claim 1, wherein the determining of the signature to be valid comprises determining the signature to be valid based on one or more of Digital Signature Algorithm (DSA) or Message Digest (MD).

8. The method as recited in claim 1, further comprising:
granting one or more privileges to the user to access data on the second system based on a logging manner of the user.

9. The method as recited in claim 8, wherein the logging manner of the user is determined based on one or more of session information stored on the second system or logon request information sent by the first system.

10. The method as recited in claim 8, wherein the one or more privileges comprise one or more of accessing transaction data associated with the first system, accessing transaction data associated with the second system, or accessing transaction data associated with a third system.

11. The method as recited in claim 1, wherein the ID mapping relationship is included in a mapping table generated based on a trust relationship between the first system and the second system.

12. Non-transitory one or more computer readable storage media having stored thereupon computer-executable instructions that, when executed by a processor, causes the processor to perform an intersystem single sign-on (SSO) procedure, the procedure comprising:
in a first system, obtaining user ID information associated with a first system;
in the first system, obtaining the user ID information associated with a second system from the user ID information associated with the first system according to a ID mapping relationship of a user between the first system and the second system, the user ID information associated with the second system being different than the user ID information associated with the first system, the first system and the second system being located in different network domains;
in the first system, creating a signature that includes a timestamp and the user ID information associated with the second system, the creating the signature taking place upon receiving a logon request redirected to the first system by the second system;
redirecting the logon request back to the second system upon the creating the signature;
sending the signature to the second system to:
validate the signature by comparing the timestamp in the signature with at least one of a present time or a timestamp in a previous signature of the user;
determine the signature to be valid when a first time indicated by the timestamp of the signature is after a second time indicated by the timestamp of the previous signature of the user and when the first time indicated by the timestamp of the signature is within a predetermined threshold duration of the present time; and
allow the user to be signed on the second system when the user ID information is validated.

13. The non-transitory one or more computer readable storage media as recited in claim 12 wherein the signature comprises a cryptographic digital signature.

14. A system, comprising:
memory;
one or more processors coupled to the memory;
an ID verification component, stored in the memory and executable on the one or more processors, that receives user ID information associated with a first system that is obtained from user ID information associated with a second system based on an ID mapping relationship of a user between the first system and the second system, the user ID information associated with the second system being different than the user ID information associated with the first system, the first system and the second system being located in different network domains; and
an ID signature verification component, stored in the memory and executable on the one or more processors, that:
receives a signature including a timestamp and the user ID information associated with the first system, the signature being created upon receiving a logon request redirected to the first system by the second system,
redirecting the logon request back to the second system upon the creating the signature;
determines that the user has visited the first system and subsequently determines the signature to be valid if:
the timestamp of the signature is within a predetermined threshold duration of a present time, and
a first time indicated by the timestamp of the signature is after a second time indicated by the timestamp of a previous signature of the user,
determines that the user has not visited the first system and subsequently determines the signature to be valid if the timestamp of the signature is within a predetermined threshold duration of a present time.

15. The system as recited in claim 14, further comprising a privilege controlling component, stored in the memory and executable on the one or more processors, that grants one or more privileges to the user to access data on the first system based on a logging manner of the user.

16. The system as recited in claim 15, wherein the logging manner of the user is determined based on one or more of session information stored on the first system or logon request information sent by the second system.

17. The system as recited in claim 15, wherein the one or more privileges comprise one or more of accessing transaction data associated with the first system, accessing transaction data associated with the second system, or accessing transaction data associated with a third system.

18. The system as recited in claim 14, wherein the ID mapping relationship is included in a mapping table generated based on a trust relationship between the first system and the second system.

19. The system as recited in claim 14, wherein the determining of the signature to be valid comprises determining the signature to be valid based on a trust relationship between the first system and the second system.

20. The system as recited in claim 14, wherein the determining of the signature to be valid comprises determining the signature to be valid based on one or more of Digital Signature Algorithm (DSA) or Message Digest (MD).

21. The system as recited in claim 14, wherein the user ID information associated with the first system is different from the user ID information associated with the second system.

* * * * *